US 9,356,546 B2

(12) United States Patent
Yang et al.

(10) Patent No.: US 9,356,546 B2
(45) Date of Patent: May 31, 2016

(54) SENSORLESS CONTROL METHOD FOR MOTOR AND SYSTEM USING THE SAME

(71) Applicants: Hyundai Motor Company, Seoul (KR); Postech Academy-Industry Foundation, Pohang Gyeongsangbuk-Do (KR)

(72) Inventors: Jaesik Yang, Gyeonggi-do (KR); Kitae Yeom, Seoul (KR); Sung Won Kim, Gyeonggi-do (KR); Tae Won Hwang, Seoul (KR); Jun Woo Kim, Gyeongsangbuk-do (KR); Kwang-Hee Nam, Gyeongsankbuk-do (KR)

(73) Assignees: Hyundai Motor Company, Seoul (KR); Postech Academy-Industry Foundation, Pohang, Gyeongsangbuk-do (KR)

( * ) Notice: Subject to any disclaimer, the term of this patent is extended or adjusted under 35 U.S.C. 154(b) by 44 days.

(21) Appl. No.: 14/551,020

(22) Filed: Nov. 23, 2014

(65) Prior Publication Data
US 2015/0365029 A1 Dec. 17, 2015

(30) Foreign Application Priority Data
Jun. 16, 2014 (KR) .................. 10-2014-0073080

(51) Int. Cl.
*H02P 6/18* (2006.01)

(52) U.S. Cl.
CPC ..................... *H02P 6/182* (2013.01)

(58) Field of Classification Search
CPC ............. H02P 6/16; H02P 6/18; H02P 6/15; H02P 6/14; H02P 6/182; H02P 6/157
USPC .................... 318/400.34, 701, 809
See application file for complete search history.

(56) References Cited

U.S. PATENT DOCUMENTS

| | | | | |
|---|---|---|---|---|
| 3,860,843 A * | 1/1975 | Kawasaki | ............ | H02K 21/22 310/156.26 |
| 4,924,125 A * | 5/1990 | Clark | ............ | H02K 1/02 310/156.26 |
| 5,384,527 A * | 1/1995 | Rozman | ............ | F02N 11/04 318/254.2 |
| 5,493,200 A * | 2/1996 | Rozman | ............ | H02P 9/08 322/10 |
| 5,594,322 A * | 1/1997 | Rozman | ............ | F02N 11/04 318/400.12 |
| 5,600,575 A * | 2/1997 | Anticole | ............ | H02H 6/005 330/146 |
| 6,841,969 B1 * | 1/2005 | Schulz | ............ | H02P 21/13 318/610 |
| 7,002,318 B1 * | 2/2006 | Schulz | ............ | B60L 3/0038 318/437 |

(Continued)

FOREIGN PATENT DOCUMENTS

| | | |
|---|---|---|
| JP | 11-235099 A | 8/1999 |
| JP | 4350676 B2 | 10/2009 |

(Continued)

*Primary Examiner* — Rita Leykin
(74) *Attorney, Agent, or Firm* — Mintz Levin Cohn Ferris Glovsky and Popeo, P.C.; Peter F. Corless (57) ABSTRACT

A sensorless control method for a motor performed by a sensorless controller including a back electromotive force (EMF) observer and a phase locked loop (PLL) controller, includes: estimating a back EMF of the motor using the back EMF observer; calculating an electrical angle error in accordance with iron loss of the motor based on the estimated back EMF; and compensating for the calculated electrical angle error, inputting the compensated electrical angle error into the PLL controller to estimate an actual angle, and controlling the motor based on the estimated actual angle.

10 Claims, 6 Drawing Sheets

(56) References Cited

U.S. PATENT DOCUMENTS

| | | | |
|---|---|---|---|
| 7,015,664 B2 * | 3/2006 | Coles | H02P 6/185 318/400.01 |
| 7,095,205 B2 * | 8/2006 | Ehsani | H02P 6/18 318/254.1 |
| 7,256,564 B2 * | 8/2007 | MacKay | H02P 6/182 318/268 |
| 7,262,536 B2 * | 8/2007 | Rahman | B60K 6/26 180/65.51 |
| 7,279,860 B2 * | 10/2007 | MacKay | H02P 6/10 318/400.34 |
| 7,288,911 B2 * | 10/2007 | MacKay | H02P 6/182 318/400.21 |
| 7,332,837 B2 * | 2/2008 | Ward | H02K 1/182 310/52 |
| 7,477,034 B2 * | 1/2009 | MacKay | H02P 6/182 318/254.1 |
| 7,482,777 B2 * | 1/2009 | Tomigashi | H02P 6/18 318/400.02 |
| 7,504,797 B2 * | 3/2009 | Tomigashi | 318/727 |
| 7,592,761 B2 * | 9/2009 | MacKay | H02P 6/20 318/254.1 |
| 7,592,766 B2 * | 9/2009 | Patel | B60K 6/26 318/400.02 |
| 7,679,308 B2 * | 3/2010 | Tomigashi | H02P 21/14 318/400.02 |
| 7,710,066 B2 * | 5/2010 | Hashimoto | H02P 21/05 318/400.01 |
| 7,772,790 B2 * | 8/2010 | Nashiki | H02K 1/145 318/400.02 |
| 8,058,824 B2 * | 11/2011 | Williams | B62D 5/046 318/265 |
| 8,115,428 B2 * | 2/2012 | Williams | B62D 5/0481 318/400.02 |
| 8,384,323 B2 * | 2/2013 | Akiyama | H02P 6/18 318/400.02 |
| 8,461,796 B2 * | 6/2013 | Takai | H02P 6/182 318/400.34 |
| 8,575,773 B2 * | 11/2013 | Tripathi | H02P 9/12 290/44 |
| 9,041,325 B2 * | 5/2015 | Yamazaki | H02P 21/0042 318/400.01 |

FOREIGN PATENT DOCUMENTS

| | | |
|---|---|---|
| JP | 4574412 B2 | 11/2010 |
| JP | 2012-166776 A | 9/2012 |
| KR | 10-2012-0054190 A | 5/2012 |

* cited by examiner

| | Motor model considering iron loss | Motor model not considering iron loss |
|---|---|---|
| d-axis equivalent circuit | | |
| q-axis equivalent circuit | | |

SENSORLESS CONTROL METHOD FOR MOTOR AND SYSTEM USING THE SAME

CROSS-REFERENCE TO RELATED APPLICATION

This application claims priority to and the benefit of Korean Patent Application No. 10-2014-0073080 filed in the Korean Intellectual Property Office on Jun. 16, 2014, the entire contents of which are incorporated herein by reference.

BACKGROUND (a) Technical Field

The present disclosure relates to a sensorless control method for a motor and a system using the same, and more particularly, to a sensorless control method for a motor and a system using the same that may stably perform sensorless control in an ultra-high-speed driving region of a motor by adding a control model based on iron loss of the motor to a back electromotive force (back EMF) observer, and by obtaining an accurate electrical angle error based on the iron loss through the control model.

(b) Description of the Related Art

As is known in the art, a motor applied to an electrical turbocharger is typically very small and thus may be greatly influenced by characteristic loss thereof. Accordingly, while the motor is driven by a conventional sensorless control method, an electrical angle error thereof increases in an ultra-high-speed driving region, and thus, the motor is not able to be controlled according to an accurate angle, thereby resulting in an uncontrolled situation.

Figure 1:
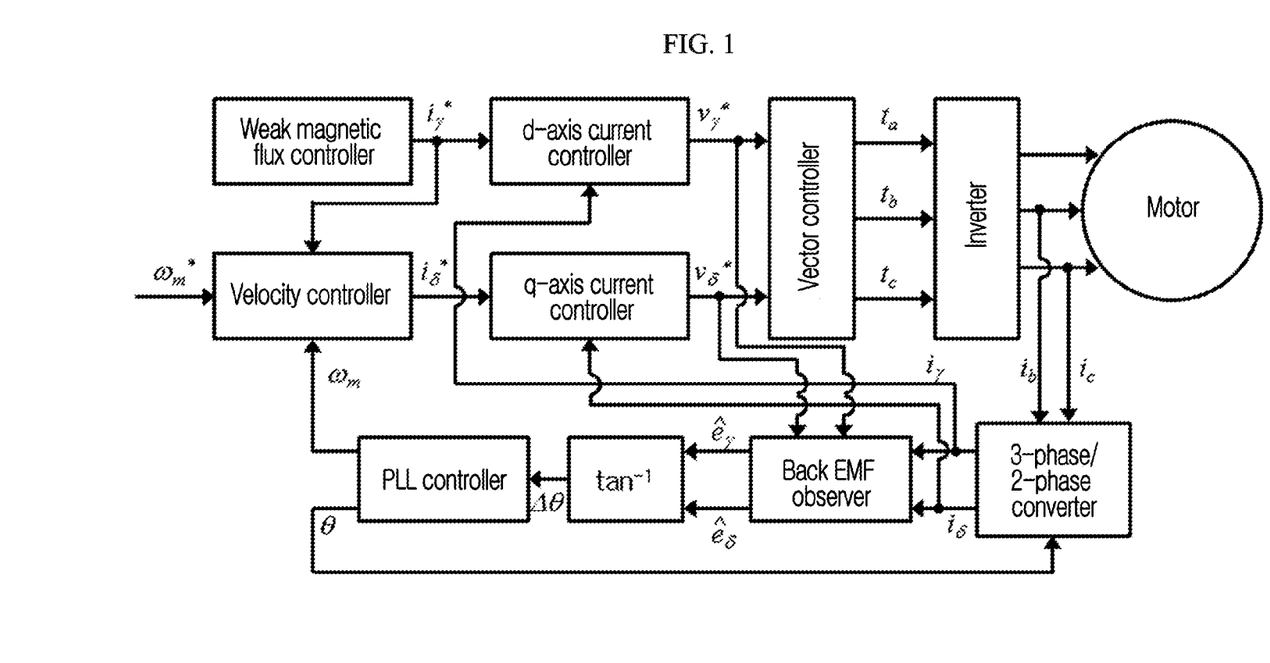
FIG. 1 is a schematic diagram illustrating a controller for controlling a typical permanent magnet motor.

Referring to FIG. 1, which illustrates a controller for a typical permanent magnet electric motor, a sensorless control method observes the back EMF using a measured phase current, d-axis, q-axis voltage, and current commands estimated from the measured phase current to obtain an electrical angle error ($\Delta\theta$). A phase-locked loop (PLL) controller is used to change the obtained electrical angle error to zero. Estimated angular velocity information may be obtained from output of the phase-locked loop controller in which the obtained electrical angle error is eliminated, and it may be used in a vector control of the motor.

To obtain an accurate electrical angle error, it is necessary to determine the back EMF, and the determination of the back EMF may be obtained from the motor model. Generally, a motor model which does not consider iron loss is used, which is not suitable for controlling an ultra-high-speed motor, at which significantly iron loss occurs. Thus, a large electrical angle error is caused when controlling the ultra-high-speed motor, making the conventional sensorless control method unstable because of the large electrical angle error that results. Therefore, it is difficult to perform the sensorless control in an ultra-high-speed driving region of about 50,000 rpm or more.

The above information disclosed in this Background section is only for enhancement of understanding of the background of the disclosure, and therefore, it may contain information that does not form the conventional art that is already known in this country to a person of ordinary skill in the art.

RELATED ART DOCUMENT

Patent Document (Patent Document 1) Japanese Laid-Open Patent Publication No. P2012-166776 (Sep. 6, 2012)

SUMMARY

Accordingly, the present disclosure has been made in an effort to provide a sensorless control method for a motor and a system using the same that may stably perform sensorless control in a ultra-high-speed driving region of a motor by adding a control model based on iron loss of the motor to a back electromotive force (back EMF) observer and by obtaining an accurate electrical angle error based on the iron loss. Further, the present disclosure has been made in an effort to provide a sensorless control method for a motor and a system using the same in which iron loss of a motor may be determined by a back EMF observer and may compensate an EMF of the motor based on the determined iron loss, calculate an accurate electrical angle error using the compensated EMF, and then use the accurate electrical angle error in control of the motor.

Emdbodiments of the present disclosure provide a sensorless control method for a motor performed by a sensorless controller which includes a back electromotive force (EMF) observer and a phase locked loop (PLL) controller, including: estimating a back EMF of the motor using the back EMF observer; calculating an electrical angle error in accordance with iron loss of the motor based on the estimated back EMF; compensating for the calculated electrical angle error; inputting the compensated electrical angle error into the PLL controller to estimate an actual angle; and controlling the motor based on the estimated actual angle.

The voltages ($v_\gamma$, $v_\delta$) of the motor based on the iron loss may be calculated using the equation below.

$$\begin{bmatrix} v_\gamma \\ v_\delta \end{bmatrix} = \begin{bmatrix} R_s + \frac{\omega_e^2 L_d L_q}{R_i} + pL_d & -\omega_e L_q + p\frac{\omega_e L_d L_q}{R_i} \\ \omega_e L_q - p\frac{\omega_e L_d L_q}{R_i} & R_s + \frac{\omega_e^2 L_d L_q}{R_i} + pL_d \end{bmatrix}$$

$$\begin{bmatrix} i_\gamma \\ i_\delta \end{bmatrix} + \begin{bmatrix} \frac{\omega_e^2 L_q \psi_m}{R_i}\cos\Delta\theta + E_{ex}\sin\Delta\theta \\ \frac{\omega_e^2 L_q \psi_m}{R_i}\sin\Delta\theta + E_{ex}\cos\Delta\theta \end{bmatrix} =$$

$$e'_{\gamma\delta} \quad E_{ex} = \omega_e[(L_d - L_q)i_d + \psi_m] - (L_d - L_q)(pi_q)$$

d, q: accurate d, q-axis
$\omega_e$: electric angular velocity of motor
$i_d$: d-axis current
$i_q$: q-axis current
$i_{di}$: d-axis iron loss current
$i_{qi}$: q-axis iron loss current
$i_{dm}$: d-axis magnetizing current
$i_{qm}$: q-axis magnetizing current
$v_d$: d-axis voltage
$v_q$: q-axis voltage
$R_s$: stator phase resistance
$R_i$: Iron loss equivalent resistance
$L_d$: d-axis inductance
$L_q$: q-axis inductance
$\psi_m$: permanent magnet flux constant $P_{iron}$: Iron loss
$P_h$: hysteresis loss
$P_{ed}$: eddy-current loss
$e_\gamma$: estimated d-axis extended EMF
$e_\delta$: estimated q-axis extended EMF
$e'_\gamma$: estimated d-axis extended EMF considering iron loss
$e'_\delta$: estimated q-axis extended EMF considering iron loss The back EMF observer may estimate the voltages ($v_\gamma$, $v_\delta$) using the equation below.

$$\begin{bmatrix} v_\gamma \\ v_\delta \end{bmatrix} = \begin{bmatrix} R_s + \frac{\omega_e^2 L_d L_q}{R_i} + pL_d & -\omega_e L_q + p\frac{\omega_e L_d L_q}{R_i} \\ \omega_e L_q - p\frac{\omega_e L_d L_q}{R_i} & R_s + \frac{\omega_e^2 L_d L_q}{R_i} + pL_d \end{bmatrix} \begin{bmatrix} i_\gamma \\ i_\delta \end{bmatrix} + \begin{bmatrix} e'_\gamma \\ e'_\delta \end{bmatrix}$$

The electrical angle error ($\Delta\theta + \alpha$) may be calculated using the equation below.

$$e'_\gamma = \frac{\omega_e^2 L_q \psi_m}{R_i} \cos\Delta\theta + E_{ex} \sin\Delta\theta = \sqrt{\left(\frac{\omega_e^2 L_q \psi_m}{R_i}\right)^2 + E_{ex}^2} \sin(\Delta\theta + \alpha)$$

$$e'_\delta = \frac{\omega_e^2 L_q \psi_m}{R_i} \sin\Delta\theta + E_{ex} \cos\Delta\theta = \sqrt{\left(\frac{\omega_e^2 L_q \psi_m}{R_i}\right)^2 + E_{ex}^2} \cos(\Delta\theta + \alpha)$$

$$\Delta\theta + \alpha = \tan^{-1}\left(\frac{e'_\gamma}{e'_\delta}\right) \quad \alpha = \tan^{-1}\left(\frac{\omega_e^2 L_q \psi_m}{R_i E_{ex}}\right)$$

The inputting of the compensated electrical angle error into the PLL controller to estimate the actual angle may include reducing the electrical angle error based on the iron loss.

Further, embodiments of the present disclosure provides a sensorless control system controlling a motor which includes a permanent magnet motor, including: a back EMF observer configured to estimate a back EMF of the motor; an angle error calculator configured to calculate an electrical angle error in accordance with iron loss of the motor based on the estimated back EMF; an angle error compensator configured to compensate for the calculated electrical angle error; and a PLL controller configured to: i) receive the compensated electrical angle error, ii) estimate an actual angle, and iii) control the motor based on the estimated actual angle.

The back EMF observer may be further configured to estimate voltages ($v_\gamma$, $v_\delta$) using the equation below.

$$\begin{bmatrix} v_\gamma \\ v_\delta \end{bmatrix} = \begin{bmatrix} R_s + \frac{\omega_e^2 L_d L_q}{R_i} + pL_d & -\omega_e L_q + p\frac{\omega_e L_d L_q}{R_i} \\ \omega_e L_q - p\frac{\omega_c L_d L_q}{R_i} & R_s + \frac{\omega_e^2 L_d L_q}{R_i} + pL_d \end{bmatrix} \begin{bmatrix} i_\gamma \\ i_\delta \end{bmatrix} + \begin{bmatrix} e'_\gamma \\ e_\delta \end{bmatrix}$$

The angle error calculator may be further configured to calculate the electrical angle error ($\Delta\theta + \alpha$) using the equation below.

$$e'_\gamma = \frac{\omega_e^2 L_d \psi_m}{R_i} \cos\Delta\theta + E_{ex} \sin\Delta\theta = \sqrt{\left(\frac{\omega_e^2 L_q \psi_m}{R_i}\right)^2 + E_{ex}^2} \sin(\Delta\theta + \alpha)$$

$$e'_\delta = -\frac{\omega_e^2 L_d \psi_m}{R_i} \sin\Delta\theta + E_{ex} \cos\Delta\theta = \sqrt{\left(\frac{\omega_e^2 L_q \psi_m}{R_i}\right)^2 + E_{ex}^2} \cos(\Delta\theta + \alpha)$$

-continued $$\Delta\theta + \alpha = \tan^{-1}\left(\frac{e'_\gamma}{e'_\delta}\right) \quad \alpha = \tan^{-1}\left(\frac{\omega_e^2 L_q \psi_m}{R_i E_{ex}}\right)$$

The PLL controller may be further configured to estimate the actual angle by reducing the electrical angle error based on the iron loss.

As described above, according to embodiments of the present disclosure, it is possible to stably perform sensorless control in an ultra-high-speed driving region of a motor by adding a control model based on iron loss of the motor to a back electromotive force (back EMF) observer and by obtaining an accurate electrical angle error in accordance with the iron loss using the control model. According to embodiments of the present disclosure, it is possible to determine the iron loss of a motor by a back EMF observer, to compensate for an EMF of the motor based on the determined iron loss, to calculate an accurate electrical angle error using the compensated EMF, and to use the accurate electrical angle error in order to control the motor.

DETAILED DESCRIPTION OF THE EMBODIMENTS

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

In addition, in the specification, unless explicitly described to the contrary, the word "comprise" and variations such as "comprises" or "comprising" will be understood to imply the inclusion of stated elements but not the exclusion of any other elements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is configured to execute the program instructions to perform one or more processes which are described further below. Moreover, it is understood that the below methods may be executed by an apparatus comprising the controller, whereby the apparatus is known in the art to be suitable for performing a sensorless control method for a motor, as described herein.

Figure 2:
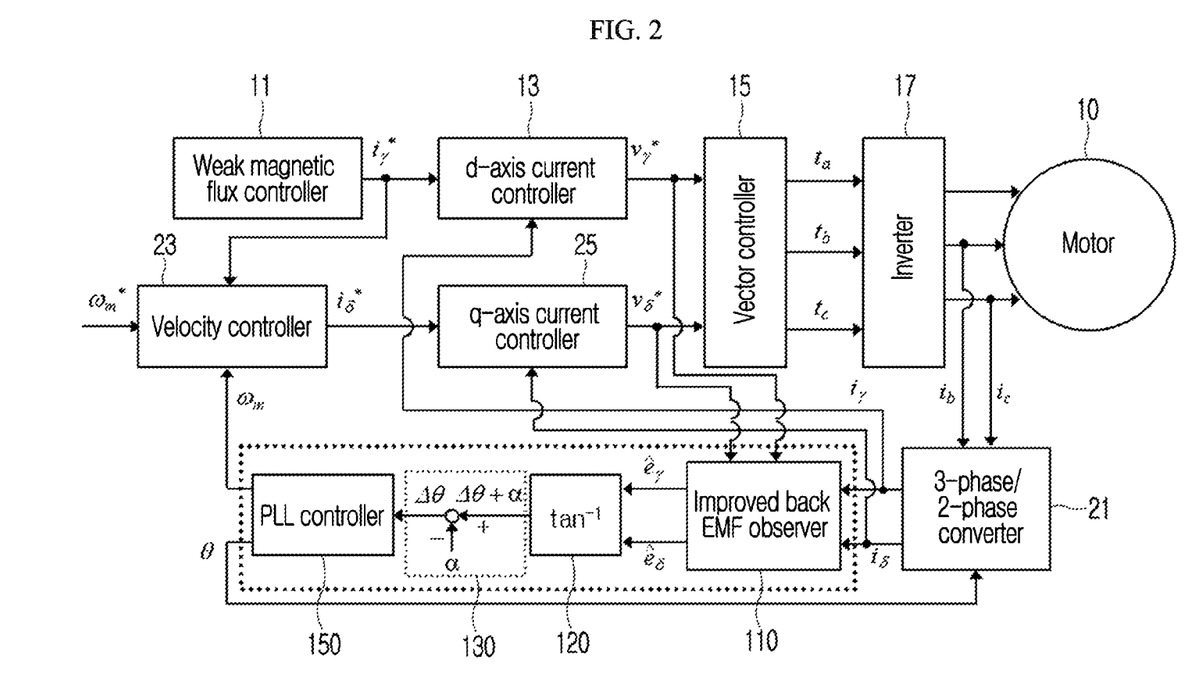
FIG. 2 is a diagram illustrating a sensorless control system for controlling a permanent magnet motor according to embodiments of the present disclosure.

FIG. 2 is a diagram illustrating a sensorless control system for controlling a permanent magnet motor according to embodiments of the present disclosure.

Referring to FIG. 2, a sensorless control system for controlling a motor (e.g., a permanent magnet motor) according to embodiments of the present disclosure includes: a back EMF observer 110 configured to estimate a back EMF of a motor 10; an angle error calculator 120 configured to calculate an electrical angle error in accordance with iron loss of the motor 10 based on the back EMF estimated by the back EMF observer 110; an angle error compensator 130 configured to compensate the electrical angle error calculated by the angle error calculator 120; and a PLL controller 150 configured to receive the compensated electrical angle error, to estimate an actual angle by reducing the electrical angle error due to the iron loss in the PLL controller 150, and to control the motor 10 based on the estimated actual angle.

Symbols denoted in FIG. 2 are referred to as definition as follows:

γ, δ: estimated d-axis, q-axis $\omega_m^*$: mechanical angular velocity command value of motor $\omega_m$: estimated mechanical angular velocity of motor (sensorless control result value thereof)

θ: estimated electrical angular velocity (sensorless control result value thereof)

Δθ: electrical angular velocity error $i_\gamma^*$: estimated d-axis current command value $i_\delta^*$: estimated q-axis current command value $i_\gamma$: estimated measured d-axis current (current measured by 3-phase/2-phase converter after current sensor)

$i_\delta$: estimated measured d-axis current (current measured by 3-phase/2-phase converter after current sensor)

$v_\gamma^*$: estimated d-axis voltage command value $v_\delta^*$: estimated q-axis voltage command value $t_a, t_b, t_c$: PWM ON times for a, b, c phases $i_b, i_c$: currents for b, c phases (or, it is allowable to measure any 2-phase currents among the 3-phase currents.)

$\hat{e}_\gamma$: extended estimated d-axis EMF value (result of observer)

$\hat{e}_\delta$: extended estimated q-axis EMF value (result of observer)

In embodiments of the present disclosure, the motor 10 may be a permanent magnet electric motor such as a motor applied to an electrical turbocharger system, but it should be understood that the scope of the present disclosure is not limited thereto.

The sensorless control system according to embodiments of the present disclosure may include the back EMF observer 110, the angle error calculator 120, the angle error compensator 130, and the PLL controller 150, as well as a weak magnetic flux controller 11, a d-axis current controller 13, a vector controller 15, an inverter 17, a velocity controller 23, a q-axis current controller 25, and a 3-phase/2-phase converter 21 as shown in FIG. 1 illustrating the controller for controlling the typical permanent magnet motor.

In embodiments of the present disclosure, the weak magnetic flux controller 11, the d-axis current controller 13, the vector controller 15, the inverter 17, the velocity controller 23, the q-axis current controller 25, and/or the 3-phase/2-phase converter 21 may be the same as or similar to those used in the related art, and thus a detailed description thereof will be omitted.

Meanwhile, voltages ($v_\gamma$, $v_\delta$) of the motor 10 may be calculated by the following equations.

$$\begin{bmatrix} v_\gamma \\ v_\delta \end{bmatrix} = \begin{bmatrix} R_s + \frac{\omega_e^2 L_d L_q}{R_i} + pL_d & -\omega_e L_q + p\frac{\omega_e L_d L_q}{R_i} \\ \omega_e L_q - p\frac{w_c L_d L_q}{R_i} & R_s + \frac{\omega_e^2 L_d L_q}{R_i} + pL_d \end{bmatrix} \begin{bmatrix} i_\gamma \\ i_\delta \end{bmatrix} +$$

$$\begin{bmatrix} \frac{\omega_e^2 L_d \psi_m}{R_i} \cos\Delta\theta + E_{ex}\sin\Delta\theta \\ -\frac{\omega_e^2 L_q \psi_m}{R_i} \sin\Delta\theta + E_{ex}\cos\Delta\theta \end{bmatrix} = e'_{\gamma\delta}$$

$$E_{ex} = \omega_e\{(L_d - L_q)i_d + \psi_m\} - (L_d - L_q)(pi_q)$$

d, q: accurate d, q-axis $\omega_e$: electric angular velocity of motor $i_d$: d-axis current $i_q$: q-axis current $i_{di}$: d-axis iron loss current $i_{qi}$: q-axis iron loss current $i_{dm}$: d-axis magnetizing current $i_{qm}$: q-axis magnetizing current $v_d$: d-axis voltage $v_q$: q-axis voltage $R_s$: stator phase resistance $R_i$: Iron loss equivalent resistance $L_d$: d-axis inductance $L_q$: q-axis inductance $\psi_m$: permanent magnet flux constant $P_{iron}$: Iron loss $P_h$: hysteresis loss $P_{ed}$: eddy-current loss $e_\gamma$: estimated d-axis extended EMF $e_\delta$: estimated q-axis extended EMF $e'_\gamma$: estimated d-axis extended EMF considering iron loss $e'_\delta$: estimated q-axis extended EMF considering iron loss Voltage ($v_\gamma$, $v_\delta$) inputted to the back EMF observer 110 may calculated by the following equation.

$$\begin{bmatrix} v_\gamma \\ v_\delta \end{bmatrix} = \begin{bmatrix} R_s + \frac{\omega_e^2 L_d L_q}{R_i} + pL_d & -\omega_e L_q + p\frac{\omega_e L_d L_q}{R_i} \\ \omega_e L_q - p\frac{\omega_c L_d L_q}{R_i} & R_s + \frac{\omega_e^2 L_d L_q}{R_i} + pL_d \end{bmatrix} \begin{bmatrix} i_\gamma \\ i_\delta \end{bmatrix} + \begin{bmatrix} e'_\gamma \\ e'_\delta \end{bmatrix}$$

In addition, the angle error calculator 120 may calculate an electrical angle error ($\Delta\theta+\alpha$) using the following equations.

$$e'_\gamma = \frac{\omega_e^2 L_d \psi_m}{R_i}\cos\Delta\theta + E_{ex}\sin\Delta\theta = \sqrt{\left(\frac{\omega_e^2 L_q \psi_m}{R_i}\right)^2 + E_{ex}^2}\,\sin(\Delta\theta+\alpha)$$

$$e'_\delta = -\frac{\omega_e^2 L_q \psi_m}{R_i}\sin\Delta\theta + E_{ex}\cos\Delta\theta = \sqrt{\left(\frac{\omega_e^2 L_q \psi_m}{R_i}\right)^2 + E_{ex}^2}\,\cos(\Delta\theta+\alpha)$$

$$\Delta\theta+\alpha = \tan^{-1}\left(\frac{e'_\gamma}{e'_\delta}\right) \quad \alpha = \tan^{-1}\left(\frac{\omega_e^2 L_q \psi_m}{R_i E_{ex}}\right)$$

A sensorless control method for method for controlling a permanent magnet motor will now be described in detail with reference to the accompanying drawings.

Figure 3:
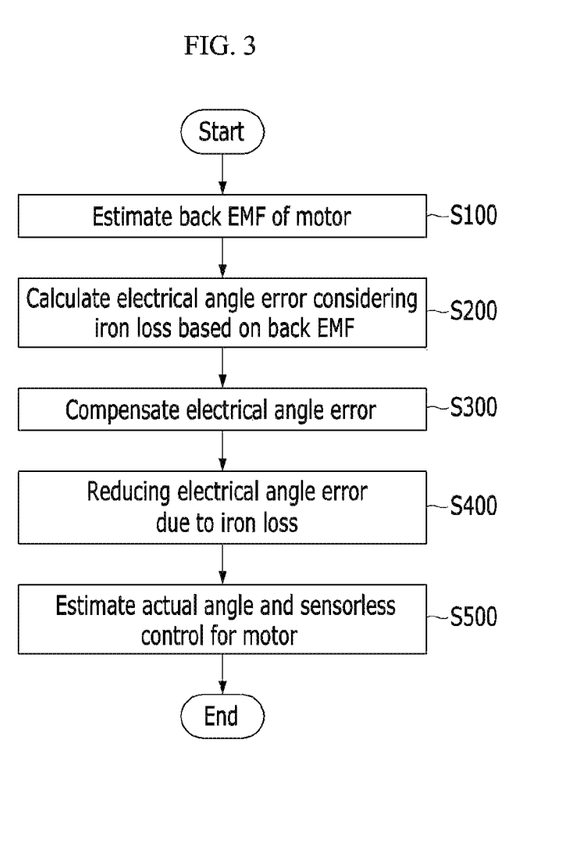
FIG. 3 is a flowchart showing a sensorless control method for controlling a permanent magnet motor according to embodiments of the present disclosure.

FIG. 3 is a flowchart showing a sensorless control method for controlling a permanent magnet motor according to embodiments of the present disclosure.

As shown in FIG. 3, the back EMF observer 110 estimates a back EMF of the motor 10 (S100), and the angle error calculator 120 calculates an electrical angle error ($\Delta\theta+\alpha$) due to iron loss of the motor 10 (S200). The electrical angle error ($\Delta\theta+\alpha$) includes an electrical angle error ($\Delta\theta$; FIG. 1) according to the related art and an error ($\alpha$) considering iron loss of the motor 10.

Accordingly, the sensorless control method according to embodiments of the present disclosure compensates the error ($\alpha$) using the angle error compensator 130 before the electrical angle error ($\Delta\theta+\alpha$) is inputted into the PLL controller 150 (S300). When the error ($\alpha$) is compensated by the angle error compensator 130, the PLL controller 150 estimates an actual angle of the motor 10 by reducing the electrical angle error (S400), and then controls the motor 10 in an ultra-high speed region thereof using the estimated actual angle (S500).

Figure 4:
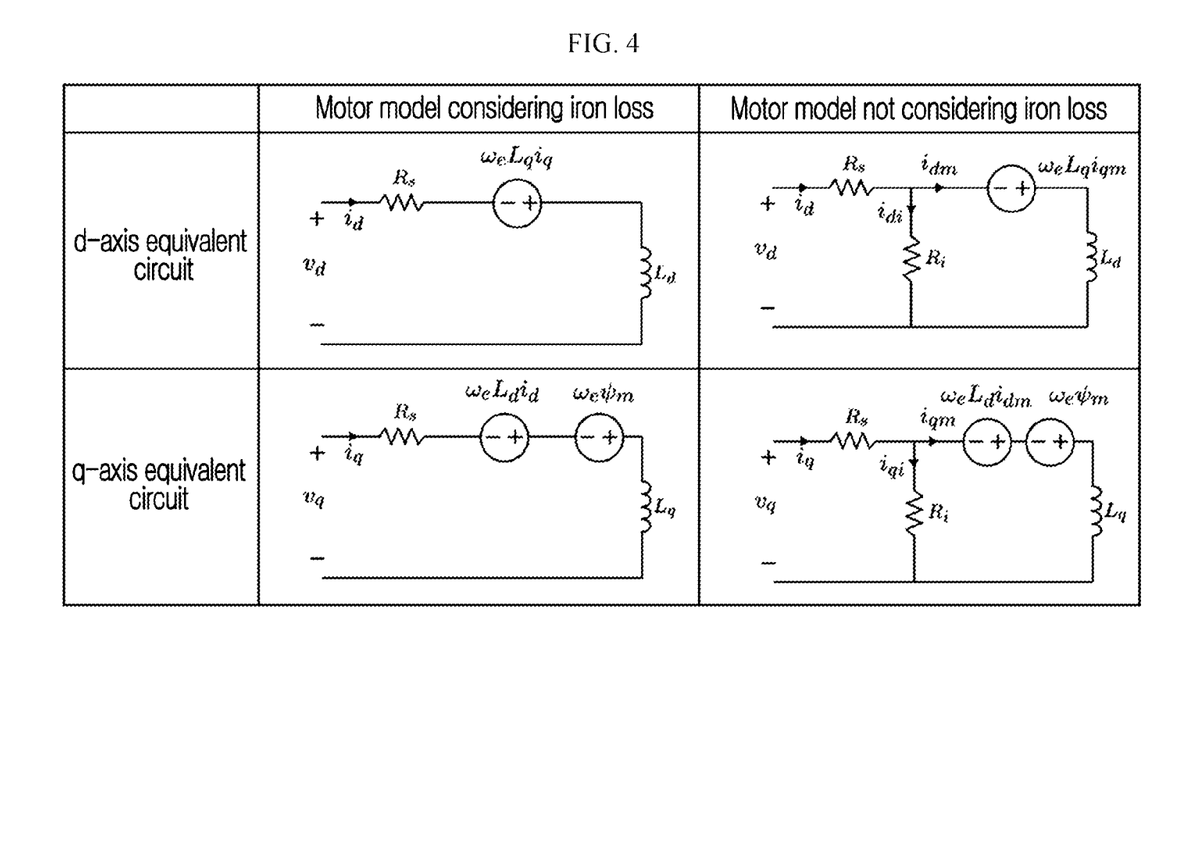
FIG. 4 is a table drawing for comparing a control model for a permanent magnet motor based on iron loss with a control model therefor not based on iron loss.

FIG. 4 is a table drawing comparing a control model for a permanent magnet motor based on iron loss with a control model therefor not based on iron loss. Symbols denoted in FIG. 4 are referred to with definition as follows.

d, q: accurate d, q-axis
$\omega_e$: electric angular velocity of motor
$i_d$: d-axis current
$i_q$: q-axis current
$i_{di}$: d-axis iron loss current
$i_{qi}$: q-axis iron loss current
$i_{dm}$: d-axis magnetizing current
$i_{qm}$: q-axis magnetizing current
$v_d$: d-axis voltage
$v_q$: q-axis voltage
$R_s$: stator phase resistance
$R_i$: Iron loss equivalent resistance
$L_d$: d-axis inductance
$L_q$: q-axis inductance
$\psi_m$: permanent magnet flux constant
$P_{iron}$: Iron loss
$P_h$: hysteresis loss
$P_{ed}$: eddy-current loss Influence on iron loss of a conventional permanent magnet motor may be researched to check influence on iron loss of the motor 10 according to embodiments of the present disclosure.

FIG. 4 is a drawing illustrating d-axis and q-axis models of a motor not based on iron loss, as well as d-axis and q-axis models based on iron loss.

As shown in FIG. 4, resistance of a resistor $R_i$ is equivalent to iron loss, and the resistor $R_i$ is connected in parallel to an inductor of a motor. Therefore, a motor model based on iron loss is different from a motor model not based on iron loss, since the sensorless control method not based on iron loss is not able to accurately measure an angle for controlling a motor.

$$P_{iron} = P_h + P_{ed}$$

Iron loss ($P_{iron}$) may respectively be divided into hysteresis loss ($P_h$) and Iron, eddy current loss ($P_{ed}$). The hysteresis loss is proportional to frequency of the current applied to the motor, and the eddy current loss is proportional to the square thereof. Because a frequency applied to the ultra-high-speed motor is twice or more higher than a frequency applied to a typical high-speed motor, iron loss of the ultra-high-speed motor is four times or more higher than iron loss of the typical high-speed motor. Accordingly, to control an ultra-high-speed motor, it is necessary to consider iron loss, as is described herein.

Figure 5:
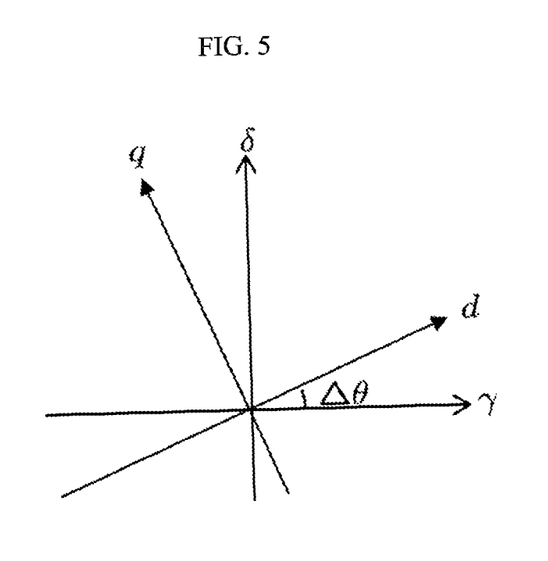
FIG. 5 is a graph illustrating a voltage equation for a motor according to embodiments of the present disclosure.

FIG. 5 is a graph illustrating a voltage equation of a motor in an ordinary axis and an inclined axis.

A conventional voltage equation of a motor with respect to the ordinary axis may utilize the following equation (a), and a voltage equation of the motor based on iron loss with respect to the ordinary axis according to embodiments of the present disclosure may utilize the following equation (b).

$$\begin{bmatrix} v_d \\ v_q \end{bmatrix} = \begin{bmatrix} R_s + pL_d & -\omega_e L_q \\ \omega_e L_d & R_s + pL_q \end{bmatrix} \begin{bmatrix} i_d \\ i_q \end{bmatrix} + \begin{bmatrix} 0 \\ \omega_e \psi_m \end{bmatrix} \quad \text{Equation (a)}$$

$$\begin{bmatrix} v_d \\ v_q \end{bmatrix} = \begin{bmatrix} R_s + \frac{\omega_e^2 L_d L_q}{R_i} + pL_d & -\omega_e L_q + p\frac{\omega_e L_d L_q}{R_i} \\ \omega_e L_q - p\frac{\omega_c L_d L_q}{R_i} & R_s + \frac{\omega_e^2 L_d L_q}{R_i} + pL_d \end{bmatrix} \begin{bmatrix} i_d \\ i_q \end{bmatrix} + \begin{bmatrix} \frac{\omega_e^2 L_q \psi_m}{R_i} \\ \omega_e \psi_m \end{bmatrix} \quad \text{Equation (b)}$$

$e_\gamma$: estimated d-axis extended EMF
$e_\delta$: estimated q-axis extended EMF
$e'_\gamma$: estimated d-axis extended EMF considering iron loss
$e'_\delta$: estimated q-axis extended EMF considering iron loss According to whether iron loss of the motor 10 is considered, the voltage equations (a) and (b) are different from each other. Because of not being able to actually know a d-axis and a q-axis of the motor, a $\gamma$-axis and a $\delta$-axis that respectively estimate the d-axis and the q-axis are substantially used. Voltage equations of the motor with respect to the inclined axis may respectively utilized the following equations (c) and (d). The following equation (c) corresponds to a conventional voltage equation of the motor not based on iron loss, and the following equation (d) corresponds to a voltage equation of the motor based on iron loss according to embodiments of the present disclosure.

$$\begin{bmatrix} v_\gamma \\ v_\delta \end{bmatrix} = \begin{bmatrix} R_s + pL_d & -\omega_e L_q \\ \omega_e L_q & R_s + pL_d \end{bmatrix} \quad \text{Equation (c)}$$

$$\begin{bmatrix} i_\gamma \\ i_\delta \end{bmatrix} + \begin{bmatrix} E_{ex}\sin\Delta\theta - (\hat{\omega}_e - \omega_e)L_d i_\delta \\ E_{ex}\cos\Delta\theta + (\hat{\omega}_e - \omega_e)L_d i_\gamma \end{bmatrix} = e_{\gamma\delta}$$

$$\begin{bmatrix} v_\gamma \\ v_\delta \end{bmatrix} = \begin{bmatrix} R_s + \frac{\omega_e^2 L_d L_q}{R_i} + pL_d & -\omega_e L_q + p\frac{\omega_e L_d L_q}{R_i} \\ \omega_e L_q - p\frac{\omega_c L_d L_q}{R_i} & R_s + \frac{\omega_e^2 L_d L_q}{R_i} + pL_d \end{bmatrix} \quad \text{Equation (d)}$$

$$\begin{bmatrix} i_d \\ i_q \end{bmatrix} + \begin{bmatrix} \frac{w_e^2 L_d \psi_m}{R_i}\cos\Delta\theta + E_{ex}\sin\Delta\theta \\ -\frac{w_e^2 L_q \psi_m}{R_i}\sin\Delta\theta + E_{ex}\sin\Delta\theta \end{bmatrix} = e'_{\gamma\delta}$$

$$E_{ex} = \omega_e\{(L_d - L_q)i_d + \psi_m\} - (L_d - L_q)(pi_q)$$

Figure 6:
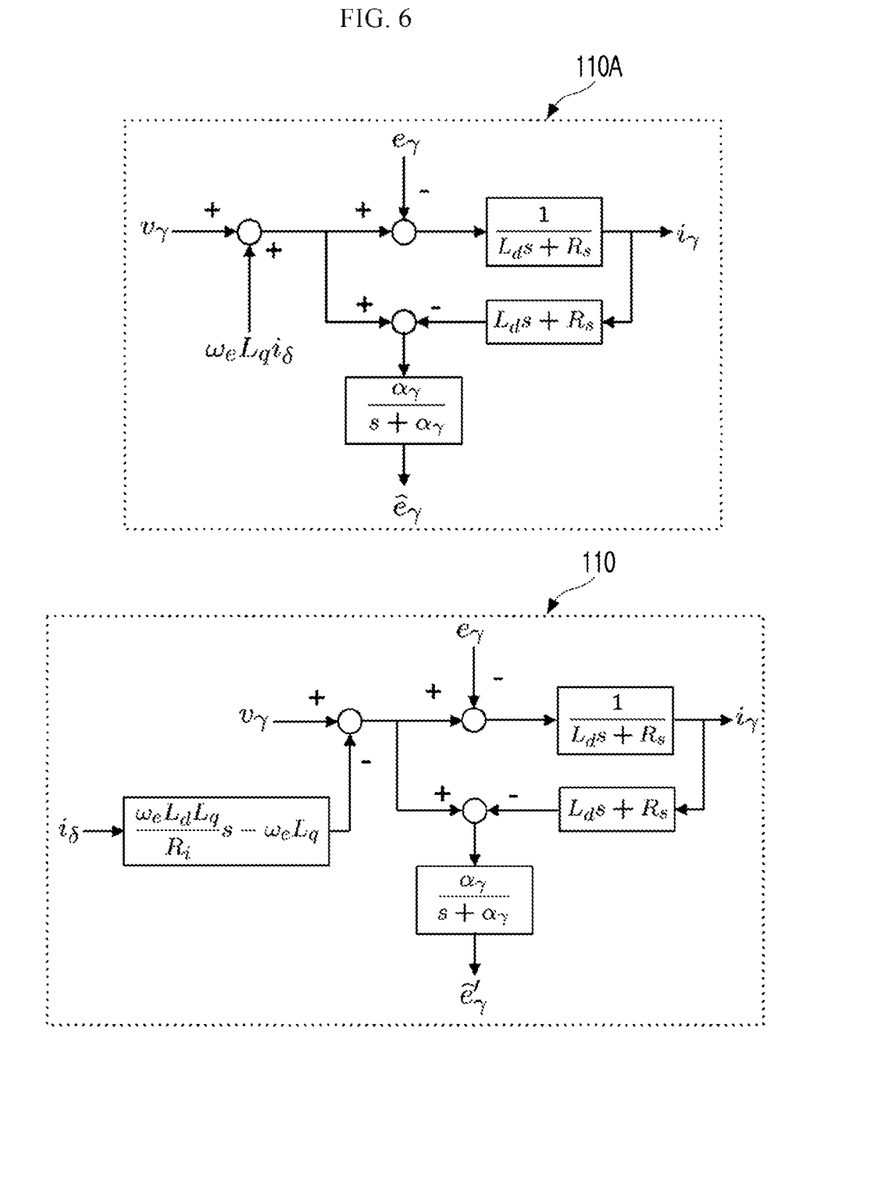
FIG. 6 is a schematic drawing for comparing an internal logic of a back EMF observer according to embodiments of the present disclosure with a conventional internal logic thereof.

FIG. 6 is a schematic drawing comparing an internal logic of the back EMF observer 110 according to embodiments of the present disclosure with a conventional internal logic of the back EMF observer 110A not based on iron loss.

According to whether iron loss of the motor 10 is considered, since the back EMF equations (e) and (f) of the back EMF observer are different from each other, the internal logic of the back EMF observer 110A should be modified to be the internal logic of the back EMF observer 110. The following equation (e) corresponds to a conventional back EMF equation, and the following equation (f) corresponds to a back EMF equation according to embodiments of the present disclosure.

When the conventional back EMF observer 110A is used, since a back EMF determination is not appropriately performed, an electrical angle error may occur.

$$\begin{bmatrix} v_\gamma \\ v_\delta \end{bmatrix} = \begin{bmatrix} R_s + pL_d & -\omega_e L_q \\ \omega_e L_q & R_s + pL_d \end{bmatrix} \begin{bmatrix} i_\gamma \\ i_\delta \end{bmatrix} + \begin{bmatrix} e_\gamma \\ e_\delta \end{bmatrix} \quad \text{Equation (e)}$$

$$\begin{bmatrix} v_\gamma \\ v_\delta \end{bmatrix} = \quad \text{Equation (f)}$$

$$\begin{bmatrix} R_s + \frac{\omega_e^2 L_d L_q}{R_i} + pL_d & -\omega_e L_q + p\frac{\omega_e L_d L_q}{R_i} \\ \omega_e L_q - p\frac{\omega_c L_d L_q}{R_i} & R_s + \frac{\omega_e^2 L_d L_q}{R_i} + pL_d \end{bmatrix} \begin{bmatrix} i_\gamma \\ i_\delta \end{bmatrix} + \begin{bmatrix} e'_\gamma \\ e'_\delta \end{bmatrix}$$

Referring to FIG. 2, even though the back EMF observer 110 accurately estimates a back EMF of the motor and calculates an electrical angle error thereof, an additional electrical angle error by α occurs as in the following equation (h) in case of based on iron loss of the motor. The following equation (g) is a conventional equation not based on iron loss of the motor. Since iron loss of the motor is not included in the following equation (g), an additional electrical angle error (α) does not exist therein.

In embodiments of the present disclosure, the additional electrical angle error (α) may be obtained by simulating and/or testing a motor, and the obtained additional electrical angle error (α) may be compensated by the angle error compensator 130.

$$e_\gamma = E_{ex}\sin\Delta\theta - (\hat{\omega}_e - \omega_e)L_d i_\delta$$

$$e_\delta = E_{ex}\cos\Delta\theta + (\hat{\omega}_e - \omega_e)L_d i_\gamma, \Delta\theta = \tan^{-1}(e_\gamma/e_\delta) \quad \text{Equation (g)}$$

$$e'_\gamma = \frac{\omega_e^2 L_d \psi_m}{R_i}\cos\Delta\theta + E_{ex}\sin\Delta\theta = \quad \text{Equation (h)}$$

$$\sqrt{\left(\frac{\omega_e^2 L_q \psi_m}{R_i}\right)^2 + E_{ex}^2}\ \sin(\Delta\theta + \alpha)$$

$$e'_\delta = -\frac{\omega_e^2 L_q \psi_m}{R_i}\sin\Delta\theta + E_{ex}\cos\Delta\theta =$$

$$\sqrt{\left(\frac{\omega_e^2 L_q \psi_m}{R_i}\right)^2 + E_{ex}^2}\ \cos(\Delta\theta + \alpha)$$

$$\Delta\theta + \alpha = \tan^{-1}\left(\frac{e'_\gamma}{e'_\delta}\right) \quad \alpha = \tan^{-1}\left(\frac{\omega_e^2 L_q \psi_m}{R_i E_{ex}}\right)$$

As described above, according to embodiments of the present disclosure, it is possible to stably perform sensorless control in an ultra-high-speed driving region of a motor by adding a control model considering iron loss of the motor to a back EMF observer and obtaining an accurate electrical angle error based on the iron loss through the control model. Further, according to embodiments of the present disclosure, it is possible to improve performance of a motor by considering iron loss of the motor through a back EMF observer, compensating for an EMF of the motor based on the considered iron loss, calculating an accurate electrical angle error using the compensated EMF, and using the accurate electrical angle error in control of the motor.

Embodiments of the present disclosure may have advantages as follows.

Stability: it is possible to stably control a motor in an ultra-high-speed driving region of more than about 50,000 rpm through estimating accurate angle associated with driving of the motor.

Enhanced efficiency: it is possible to reduce an electrical burden loaded on a motor by efficiently using back EMF of the motor, thereby enhancing efficiency of an ultra-high-speed motor system.

Enlarged drivability: it is possible to drive a motor even in an ultra-high-speed driving region of more than about 100,000 rpm by accurately calculating a driving angle of a motor. (It is difficult to drive a motor in an ultra-high-speed driving region of more than about 50,000 rpm in the related art.)

Improved performance: it is possible to improve efficiency of d-axis and q-axis current and voltage control based on accurate angle information with respect to a motor, thereby improving torque and power performance of the motor.

While the embodiments have been described in connection with a permanent magnet motor for a turbocharger, the embodiments may be applied to an ultra-high-speed motor for a micro-turbine generator, an ultra-high-speed motor for a circular compressor, an ultra-high-speed motor for a pump, and so on. Therefore, the description of the permanent magnet motor herein should not be treated as limited the applicability of the present disclosure.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

DESCRIPTION OF REFERENCE NUMERALS

10: motor
110: back electromotive force (EMF) observer

120: angle error calculator
130: angle error compensator
150: phase locked loop (PLL) controller

What is claimed is:

1. A sensorless control method for a motor performed by a sensorless controller including a back electromotive force (EMF) observer and a phase locked loop (PLL) controller, comprising:
    estimating a back EMF of the motor using the back EMF observer;
    calculating an electrical angle error in accordance with iron loss of the motor based on the estimated back EMF;
    compensating for the calculated electrical angle error;
    inputting the compensated electrical angle error into the PLL controller to estimate an actual angle; and
    controlling the motor based on the estimated actual angle.

2. The sensorless control method of claim 1, wherein voltages ($v_\gamma$, $v_\delta$) of the motor based on the iron loss are calculated using the following equation:

$$\begin{bmatrix} v_\gamma \\ v_\delta \end{bmatrix} = \begin{bmatrix} R_s + \frac{\omega_e^2 L_d L_q}{R_i} + pL_d & -\omega_e L_q + p\frac{\omega_e L_d L_q}{R_i} \\ \omega_e L_q - p\frac{\omega_c L_d L_q}{R_i} & R_s + \frac{\omega_e^2 L_d L_q}{R_i} + pL_d \end{bmatrix} \begin{bmatrix} i_\gamma \\ i_\delta \end{bmatrix} +$$

$$\begin{bmatrix} \frac{\omega_e^2 L_d \psi_m}{R_i}\cos\Delta\theta + E_{ex}\sin\Delta\theta \\ -\frac{\omega_e^2 L_q \psi_m}{R_i}\sin\Delta\theta + E_{ex}\cos\Delta\theta \end{bmatrix} = e'_{\gamma\delta}$$

$$E_{ex} = \omega_e\{(L_d - L_q)i_d + \psi_m\} - (L_d - L_q)(pi_q)$$

d, q: accurate d, q-axis
$\omega_e$: electric angular velocity of motor
$i_d$: d-axis current
$i_q$: q-axis current
$i_{di}$: d-axis iron loss current
$i_{qi}$: q-axis iron loss current
$i_{dm}$: d-axis magnetizing current
$i_{qm}$: q-axis magnetizing current
$v_d$: d-axis voltage
$v_q$: q-axis voltage
$R_s$: stator phase resistance
$R_i$: Iron loss equivalent resistance
$L_d$: d-axis inductance
$L_q$: q-axis inductance
$\psi_m$: permanent magnet flux constant
$P_{iron}$: Iron loss
$P_h$: hysteresis loss
$P_{ed}$: eddy-current loss
$e_\gamma$: estimated d-axis extended EMF
$e_\delta$: estimated q-axis extended EMF
$e'_\gamma$: estimated d-axis extended EMF considering iron loss
$e'_\delta$: estimated q-axis extended EMF considering iron loss.

3. The sensorless control method of claim 1, wherein the back EMF observer estimates voltages ($v_\gamma$, $v_\delta$) of the motor using the following equation:

$$\begin{bmatrix} v_\gamma \\ v_\delta \end{bmatrix} = \begin{bmatrix} R_s + \frac{\omega_e^2 L_d L_q}{R_i} + pL_d & -\omega_e L_q + p\frac{\omega_e L_d L_q}{R_i} \\ \omega_e L_q - p\frac{\omega_c L_d L_q}{R_i} & R_s + \frac{\omega_e^2 L_d L_q}{R_i} + pL_d \end{bmatrix} \begin{bmatrix} i_\gamma \\ i_\delta \end{bmatrix} + \begin{bmatrix} e'_\gamma \\ e'_\delta \end{bmatrix}.$$

4. The sensorless control method of claim 1, wherein the electrical angle error ($\Delta\theta+\alpha$) is calculated using the following equation:

$$e'_\gamma = \frac{\omega_e^2 L_d \psi_m}{R_i}\cos\Delta\theta + E_{ex}\sin\Delta\theta = \sqrt{\left(\frac{\omega_e^2 L_q \psi_m}{R_i}\right)^2 + E_{ex}^2}\sin(\Delta\theta + \alpha)$$

$$e'_\delta = -\frac{\omega_e^2 L_q \psi_m}{R_i}\sin\Delta\theta + E_{ex}\cos\Delta\theta = \sqrt{\left(\frac{\omega_e^2 L_q \psi_m}{R_i}\right)^2 + E_{ex}^2}\cos(\Delta\theta + \alpha)$$

$$\Delta\theta + \alpha = \tan^{-1}\left(\frac{e'_\gamma}{e'_\delta}\right) \quad \alpha = \tan^{-1}\left(\frac{w_e^2 L_q \psi_m}{R_i E_{ex}}\right).$$

5. The sensorless control method of claim 1, wherein the inputting of the compensated electrical angle error into the PLL controller to estimate the actual angle comprises reducing the electrical angle error based on the iron loss.

6. A sensorless control system controlling a motor including a permanent magnet motor, comprising:
    a back EMF observer configured to estimate a back EMF of the motor;
    an angle error calculator configured to calculate an electrical angle error in accordance with iron loss of the motor based on the estimated back EMF;
    an angle error compensator configured to compensate for the calculated electrical angle error; and
    a PLL controller configured to: i) receive the compensated electrical angle error, ii) estimate an actual angle, and iii) control the motor based on the estimated actual angle.

7. The sensorless control system of claim 6, wherein voltages ($v_\gamma$, $v_\delta$) of the motor based on the iron loss are calculated by the following equation:

$$\begin{bmatrix} v_\gamma \\ v_\delta \end{bmatrix} = \begin{bmatrix} R_s + \frac{\omega_e^2 L_d L_q}{R_i} + pL_d & -\omega_e L_q + p\frac{\omega_e L_d L_q}{R_i} \\ \omega_e L_q - p\frac{\omega_c L_d L_q}{R_i} & R_s + \frac{\omega_e^2 L_d L_q}{R_i} + pL_d \end{bmatrix} \begin{bmatrix} i_\gamma \\ i_\delta \end{bmatrix} +$$

$$\begin{bmatrix} \frac{\omega_e^2 L_d \psi_m}{R_i}\cos\Delta\theta + E_{ex}\sin\Delta\theta \\ -\frac{\omega_e^2 L_q \psi_m}{R_i}\sin\Delta\theta + E_{ex}\cos\Delta\theta \end{bmatrix} = e'_{\gamma\delta}$$

$$E_{ex} = \omega_e\{(L_d - L_q)i_d + \psi_m\} - (L_d - L_q)(pi_q)$$

d, q: accurate d, q-axis
$\omega_e$: electric angular velocity of motor
$i_d$: d-axis current
$i_q$: q-axis current
$i_{di}$: d-axis iron loss current
$i_{qi}$: q-axis iron loss current
$i_{dm}$: d-axis magnetizing current
$i_{qm}$: q-axis magnetizing current
$v_d$: d-axis voltage
$v_q$: q-axis voltage
$R_s$: stator phase resistance
$R_i$: Iron loss equivalent resistance $L_d$: d-axis inductance
$L_q$: q-axis inductance
$\psi_m$: permanent magnet flux constant
$P_{iron}$: Iron loss
$P_h$: hysteresis loss
$P_{ed}$: eddy-current loss
$e_\gamma$: estimated d-axis extended EMF
$e_\delta$: estimated q-axis extended EMF
$e'_\gamma$: estimated d-axis extended EMF considering iron loss
$e'_\delta$: estimated q-axis extended EMF considering iron loss.

8. The sensorless control system of claim 6, wherein the back EMF observer is further configured to estimate voltages $(v_\gamma, v_\delta)$ using the following equation:

$$\begin{bmatrix} v_\gamma \\ v_\delta \end{bmatrix} = \begin{bmatrix} R_s + \frac{\omega_e^2 L_d L_q}{R_i} + pL_d & -\omega_e L_q + p\frac{\omega_e L_d L_q}{R_i} \\ \omega_e L_q - p\frac{\omega_e L_d L_q}{R_i} & R_s + \frac{\omega_e^2 L_d L_q}{R_i} + pL_d \end{bmatrix} \begin{bmatrix} i_\gamma \\ i_\delta \end{bmatrix} + \begin{bmatrix} e'_\gamma \\ e'_\delta \end{bmatrix}$$

9. The sensorless control system of claim 6, wherein the angle error calculator is further configured to calculate the electrical angle error $(\Delta\theta+\alpha)$ using the following equation:

$$e'_\gamma = \frac{\omega_e^2 L_d \psi_m}{R_i}\cos\Delta\theta + E_{ex}\sin\Delta\theta = \sqrt{\left(\frac{\omega_e^2 L_q \psi_m}{R_i}\right)^2 + E_{ex}^2}\ \sin(\Delta\theta + \alpha)$$

$$e'_\delta = -\frac{\omega_e^2 L_q \psi_m}{R_i}\sin\Delta\theta + E_{ex}\cos\Delta\theta = \sqrt{\left(\frac{\omega_e^2 L_q \psi_m}{R_i}\right)^2 + E_{ex}^2}\ \cos(\Delta\theta + \alpha)$$

$$\Delta\theta + \alpha = \tan^{-1}\left(\frac{e'_\gamma}{e'_\delta}\right) \quad \alpha = \tan^{-1}\left(\frac{\omega_e^2 L_q \psi_m}{R_i E_{ex}}\right).$$

10. The sensorless control system of claim 6, wherein the PLL controller is further configured to estimate the actual angle by reducing the electrical angle error based on the iron loss.

* * * * *